United States Patent
Bremler-Barr et al.

(10) Patent No.: US 7,342,929 B2
(45) Date of Patent: Mar. 11, 2008

(54) WEIGHTED FAIR QUEUING-BASED METHODS AND APPARATUS FOR PROTECTING AGAINST OVERLOAD CONDITIONS ON NODES OF A DISTRIBUTED NETWORK

(75) Inventors: Anat Bremler-Barr, Holon (IL); Dan Touitou, Ramat-Gan (IL); Keren Horvitz, Hod Hasharon (IL); Rephael Tzadikario, Kefar Sava (IL); Yehuda Afek, Hod-HaSharon (IL)

(73) Assignee: Cisco Technology, Inc., San Jose, CA (US)

( * ) Notice: Subject to any disclaimer, the term of this patent is extended or adjusted under 35 U.S.C. 154(b) by 1030 days.

(21) Appl. No.: 10/134,048

(22) Filed: Apr. 26, 2002

(65) Prior Publication Data

US 2003/0076848 A1    Apr. 24, 2003

Related U.S. Application Data

(60) Provisional application No. 60/286,943, filed on Apr. 27, 2001.

(51) Int. Cl.
    *H04L 12/28* (2006.01)
(52) U.S. Cl. .................... 370/395.4; 370/412
(58) Field of Classification Search ............ None
    See application file for complete search history.

(56) References Cited

U.S. PATENT DOCUMENTS

| | | | | |
|---|---|---|---|---|
| 5,689,508 A | 11/1997 | Lyles | ................ | 370/391 |
| 5,905,730 A | 5/1999 | Yang et al. | ................ | 370/429 |
| 5,917,822 A * | 6/1999 | Lyles et al. | ............... | 370/395.4 |
| 5,956,340 A * | 9/1999 | Afek et al. | ................ | 370/412 |
| 6,041,059 A * | 3/2000 | Joffe et al. | ................ | 370/412 |

(Continued)

FOREIGN PATENT DOCUMENTS

WO    WO 02/33870    4/2002

OTHER PUBLICATIONS

Bennett, J.C.R. et al. "Hierarchical Packet Fair Queueing Algorithms.", IEEE (Oct. 1997).

(Continued)

*Primary Examiner*—Edan Orgad
*Assistant Examiner*—Jung Park
(74) *Attorney, Agent, or Firm*—David J. Powsner; Daniel J. Kligler

(57) ABSTRACT

An improved network device that controls throughput of packets received thereby, e.g., to downstream devices or to downstream logic contained within the same network device. The network device comprises a scheduler that schedules one or more packets of a selected class for throughput as a function of a weight of that class and weights of one or more other classes. The weight of at least the selected class is dynamic and is a function of a history of volume of packets received by the network device in the selected class. An apparatus for protecting against overload conditions on a network, e.g., of the type caused by DDoS attacks, has a scheduler and a token bucket mechanism, e.g., as described above. Such apparatus can also include a plurality of queues into which packets of the respective classes are placed on receipt by the apparatus. Those packets are dequeued by the scheduler, e.g., in the manner described above, for transmittal to downstream devices (e.g., potential victim nodes) on the network.

37 Claims, 6 Drawing Sheets

U.S. PATENT DOCUMENTS

| | | | | |
|---|---|---|---|---|
| 6,072,800 | A | 6/2000 | Lee | 370/412 |
| 6,134,217 | A | 10/2000 | Stiliadis et al. | 370/232 |
| 6,182,142 | B1* | 1/2001 | Win et al. | 709/229 |
| 6,208,652 | B1 | 3/2001 | Stephens et al. | 370/395 |
| 6,215,769 | B1* | 4/2001 | Ghani et al. | 370/230 |
| 6,862,265 | B1* | 3/2005 | Appala et al. | 370/235 |
| 6,862,291 | B2* | 3/2005 | Talpade et al. | 370/412 |
| 6,975,638 | B1* | 12/2005 | Chen et al. | 370/412 |
| 7,058,974 | B1* | 6/2006 | Maher et al. | 726/13 |
| 2001/0012272 | A1* | 8/2001 | Aubert et al. | 370/230 |
| 2002/0097726 | A1* | 7/2002 | Garcia-Luna-Aceves et al. | 370/395.31 |
| 2002/0114334 | A1* | 8/2002 | Yang | 370/395.1 |
| 2005/0175014 | A1* | 8/2005 | Patrick | 370/395.43 |

OTHER PUBLICATIONS

Bennett, J.C.R. et al. "High Speed, Scalable, and Accurage Implementation of Fair Queueing Algorithms in ATM Networks.", ICNP (1997).

Bennett, J.C.R. et al. "WF$^2$Q: Worst-case Fair Weighted Fair Queueing.", Infocom'96.

Chiussi, F.M. et al. "Implementing Fair Queueing in ATM Switches: The Discrete-Rate Approach.", IEEE'1997.

Chiussi, F.M. et al. "Minimum-Delay Self-Clocked Fair Queueing Algorithm for Packet-Switched Networks.",IEEE 1998.

Demers, A. et al. "Analysis and Simulation of a Fair Queueing Algorithm," © 1989 Association for Computing Machinery.

Eckhardt, D.A. et al. "Effort-limited Fair (ELF) Scheduling for Wireless Networks," IEEE Infocom 2000.

Golestani, S.J. "Network Delay Analysis of a Class of Fair Queueing Algorithms," IEEE Journal on Selected Areas in Communications, vol. 13 No. 6 (Aug. 1995) pp. 1057-1070.

Golestani, S.J. "A Self-Clocked Fair Queueing Scheme for Broadband Applications," IEEE © 1994 pp. 5c.1.1-5c1.11.

Greenberg, Albert G. et al. "How Fair is Fair Queuing?" Journal of the Association for Computing Machinery vol. 39 No. 3 (Jul. 1992) pp. 568-598.

Parekh, A.K.J. "A Generalized Processor Sharing Approach to Flow Control in Integrated Services Networks," Ph.D. Dissertation Massachusetts Institute of Technology (Feb. 1992).

Parekh, A.K. et al. "A Generalized Processor Sharing Approach to Flow Control in Integrated Services Networks: The Multiple Node Case," IEEE/ACM Transactions on Networking vol. 2 No. 2 (Apr. 1994) pp. 137-150.

Parekh, A.K. et al. "A Generalized Processor Sharing Approach to Flow Control in Integrated Services Networks: The Single-Node Case," IEEE/ACM Transactions on Networking vol. 1, No. 3 (Jun. 1993) pp. 344-357.

"Quality of Service Networking," downloaded from the web (address: http://www.cisco.com/univercd/cc/td/doc/cisintwk/ ito_doc/qos.htm) © Cisco Systems, Inc., 1999.

Rexford, J.L. et al. "Hardware-Efficient Fair Queueing Architectures for High-Speed Networks," IEEE © 1996 pp. 5d.2.1-5d.2.9.

Shreedhar M. et al. "Efficient Fair Queuing Using Deficit Round-Robin," IEEE/ACM Transactions on Networking vol. 4 No. 3 (Jun. 1996) pp. 375-385.

Stiliadis, D. et al. "Frame-based Fair Queueing: A New Traffic Scheduling Algorithm for Packet-Switched Networks," (Jul. 18, 1995) pp. 1-43.

U.S. Appl. No. 09/929,877, filed Aug. 14, 2001, entitled: "Method and apparatus for protecting against overloaded conditions on nodes of a distributed network".

U.S. Appl. No. 60/286,943, filed Apr. 27, 2001, entitled: "Weighted-fair queuing based apparatus for defending against distributed denial of service attacks".

* cited by examiner

WEIGHTED FAIR QUEUING-BASED METHODS AND APPARATUS FOR PROTECTING AGAINST OVERLOAD CONDITIONS ON NODES OF A DISTRIBUTED NETWORK

This application claims the benefit of U.S. Provisional Patent Application Ser. No. 60/286,943 filed Apr. 27, 2001, entitled "Weighted-Fair-Queuing Based Apparatus For Defending Against Distributed Denial Of Service Attacks," the teachings of which are incorporated herein by reference.

BACKGROUND OF THE INVENTION

The invention pertains to distributed data networks and, more particularly, protecting against overload conditions at nodes of such networks. It has application, by way of non-limiting example, in protecting servers, sites and other elements of networks, such as the Internet and the like, from distributed denial of service (DDoS) attacks and flash crowds.

Early computer systems were typically stand-alone devices that processed only commands and data entered via dedicated local keyboards, tape drives, disk drives, card readers, or the like. Remote access was possible, but only via phone lines and modems, which essentially served as surrogates or proxies to remote users' keyboards. By the early 1980's, a national network had been developed for carrying data communications between university, defense department and other large computer systems. This early Internet (known then as the ARPANET), which relied on a mix of dedicated lines and modems, was inaccessible to the public at large and, hence, subject to outages and espionage but, for the most part, not wide scale attack from "hackers."

Through the 1990's, that national network expanded around the globe adding millions of governmental, research and commercial nodes. The latter included so-called Internet service providers (ISPs) that afforded low-cost access to the masses. People being as they are, this included a mischievous if not downright scurrilous element intent—at least insofar as their time, resources and interests permitted—on blocking access to popular nodes (or "sites") on the network. The most insidious form of this cybervandalism is the distributed denial of service (DDoS) attack, in which the computers that service requests coming in to a node are swamped by millions of fake requests that may seem to come from many sources but, ultimately, emanate from a few hackers' computers.

Despite numerous DDoS attacks that have taken place over the past few years, with a surge of attacks on YAHOO, CNN, and many other major sites, there is still no known online solution for defense against them.

In view of the foregoing, an object of this invention is to provide improved distributed data networks and methods of operation thereof. A related object of the invention is to provide improved nodes, devices and methods of operation thereof for use on such distributed data networks.

Further related objects are to provide such improved data networks, nodes, devices and methods of operation thereof that provide enhanced protection from overload conditions, malicious, legitimate or otherwise.

A still further related object is to provide such improved data networks, nodes, devices and methods of operation thereof that provide enhanced protection from DDoS attacks.

Yet still further object of the invention is to provide such improved data networks, nodes, devices and methods of operation thereof as can be used in existing networks, such as the Internet, as well as in other networks.

Yet a still further object of the invention is to provide data networks, nodes, devices and methods of operation thereof as can be implemented at low cost and are scalable.

SUMMARY OF THE INVENTION

The foregoing are among the objects attained by the invention which provides, in one aspect, an improved network device that controls throughput of packets received thereby, e.g., to downstream devices or to downstream logic contained within the same network device. The network device comprises a scheduler that schedules one or more packets of a selected class for throughput as a function of a weight of that class and weights of one or more other classes. The weight of at least the selected class is dynamic and is a function of a history of volume of packets received by the network device in the selected class.

Related aspects of the invention provide a network device as described above in which the scheduler is substantially a weighted fair queuing (WFQ) scheduler that uses, as a weight for the one or more packets of the selected class, the dynamic weight of the class. Further related aspects of the invention provide such a network device in which the scheduler is a round robin or deficit round robin (DRR) scheduler which, again, uses as a weight for the one or more packets of the selected class, the dynamic weight of that class.

Still further aspects of the invention provide a network device as described above comprising a rate-limiter that determines the dynamic weight of at least the selected class. That rate-limiter can be any of a leaky bucket mechanism and a token bucket mechanism (collectively, "token bucket mechanism") which uses a bucket for each of at least the selected class and one or more other classes, and which models each bucket as (i) filling at a rate associated with the respective class, (ii) having a minimum capacity associated with that class, and a maximum capacity associated with that class.

Still other aspects of the invention provide a network device as described above in which the token bucket mechanism reduces each bucket proportionally to a volume of packets throughput for the respective class by the scheduler. Related aspects of the invention provide for determining a volume of a bucket for at least a class i for an epoch $t_2$ during which one or more packets for that class are actually or theoretically pending for throughput as a function of a relation $$L_i(t_2) = \max\left\{B_i^{\min}, \min\left\{B_i, L_i(t_1) - (t_2 - t_1)C\frac{W_i(t_1)}{\sum\limits_{j\ \text{active at}\ t_1} W_j(t_1)} + (t_2 - t_1)r_i\right\}\right\}$$

where $L_i(t_2)$ is the volume of the bucket for class i during epoch $t_2$;

$L_i(t_1)$ is the volume of the bucket for class i during epoch $t_1$;

$B_i^{min}$ is a minimum capacity for the bucket for class i;

$B_i$ is a maximum capacity for the bucket for class i;

C is a measure of overall traffic throughput by the device;

$W_i(t_1)$ is a weight assigned to class i during epoch $t_1$;
$W_j(t_1)$ is a weight assigned to class j during epoch $t_1$;
$r_i$ is a filling rate of the bucket for class i.

Related aspects of the invention provide for determining a volume of a bucket for at least a class i for an epoch $t_2$ during which one or more packets for that class are not actually or theoretically pending for throughput as a function of a relation $$L_i(t_2) = \max\{B_i^{min}, \min\{B_i, L_i(t_1)+(t_2-t_1)r_i\}\}$$

where $L_i(t_2)$ is the volume of the bucket for class i during epoch $t_2$;

$L_i(t_1)$ is the volume of the bucket for class i during epoch $t_1$;

$B_i^{min}$ is a minimum capacity for the bucket for class i;

$B_i$ is a maximum capacity for the bucket for class i;

$r_i$ is a filling rate of the bucket for class i.

Still further related aspects of the invention provide for determining a volume of the bucket for class i at epoch t during which one or more packets are throughput as a function of the relation $$L_i(t) = \max\{B_i^{min}, \min\{B_i, L_i(t)-D\}\}$$

where $L_i(t)$ is the volume of the bucket for class i during epoch t;

$B_i^{min}$ is a minimum capacity for the bucket for class i;

$B_i$ is a maximum capacity for the bucket for class i;

D is an actual or estimated size of the one or more packets throughput.

Yet still further related aspects of the invention provide network devices as described above in which the scheduler schedules for throughput at a time t a volume of packets of the selected class that is proportional to a content of the bucket for that class at that time. The scheduler can schedule for throughput only whole packets of a class and, if there are partial packets that would otherwise be scheduled for throughput, it can credit the bucket associated with that class accordingly.

In other aspects the invention provides apparatus for protecting against overload conditions on a network, e.g., of the type caused by DDoS attacks, having a scheduler and a token bucket mechanism, e.g., as described above. Such apparatus can also include a plurality of queues into which packets of the respective classes are placed on receipt by the apparatus. Those packets are dequeued by the scheduler, e.g., in the manner described above, for transmittal to downstream devices (e.g., potential victim nodes) on the network.

Still other aspects of the invention provide apparatus as described above having one or more classifiers that classify packets for placement in the queues. This can be on the basis, for example, of source IP addresses, source TCP/IP ports, destination IP addresses, destination TCP/IP port numbers, protocol types, and/or other parameters, associated with the packets.

Related aspects of the invention provide such apparatus with functionality that determines suspiciousness of a packet. The classifiers, according to these aspects, place the packets in the queues based both on classification and on suspiciousness. Packets of a higher degree of suspiciousness are placed, for example, in different queues from packets of a lower degree of suspiciousness. The scheduler schedules with lower priority queues allocated to the former, and with higher priority queues allocated to the latter.

Further aspects of the invention provide a network apparatus as described above that includes a marking mechanism which transmits a cookie to a packet source on the network and causes that source to include the cookie in packets transmitted by it to on the network to a destination associated with the apparatus. The marking mechanism can, moreover, strip the cookie from any packets transmitted by the source to the destination. It can also determine the suspiciousness of a packet based on a cookie, if any, therein. As above, that suspiciousness can be used by a classifier in determining placement of a packet in a queue.

Related aspects of the invention can utilize such cookies to discern individual user session from among stream of packets that have the same source and destination IP addresses, ports and/or packet types.

Still further aspects of the invention provide methods paralleling the operations described above. These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Terminology

Information transfers on the Internet are broken into variable size packets, each of which contains, in addition to its data (payload), control information to be used for its routing and scheduling over the network. In the sections that follow, the terms below are used in the conventional sense (also provided below), except where otherwise evident from context, to characterize information transfers of the Internet and, more generally, over IP networks.

IP address: A 32 bit label that uniquely identifies a device.

TCP/IP port number: A 16 bit label that uniquely identifies an application within a device.

Packet Labels (Identifiers): Each IP packet is labeled by the following five labels: 1) Source IP address, 2) Source TCP/IP port number, 3) Destination IP address, 4) Destination TCP/IP port number, and 5) Protocol type. These labels are used by TCP/IP for controlling and routing the packet.

IP connection: A source application/destination application pair which exchange data. The connection can be uniquely identified by the five packet labels described above.

IP flow: The packets transmitted over an IP connection.

HTTP: A protocol running over TCP/IP supporting the retrieval of web pages by clients from Web servers.

HTTP Proxy: A mediator server that is used to mediate between a collection of HTTP clients and HTTP servers. The HTTP proxy receives the HTTP requests from the clients associated with it, and serves them either by retrieving the requested documents from its own memory or by requesting them (and retrieving them) from the network (the proper HTTP server). Note that when an HTTP proxy server conducts the retrieval from the network it sends a request whose source ID (IP address and port) is that of the HTTP proxy server. Thus, in this event the traffic shipped to the HTTP server over the network does not carry the IP address/port of the client who made the request; rather it carries the IP address/port of the HTTP proxy server.

Cookie: A label that is used by HTTP servers to identify HTTP clients, typically with unique codes (such as user IDs). The HTTP server assigns the label to each client, which the latter uses in further accesses to the server. Note that when a client sends a cookie via a proxy server, the cookie is preserved; that is, when the proxy server issues the request to the server it includes in it the cookie as placed on the original request by the client.

Session: A series of requests and responses between a website, server, or other target and a human end-user, typically, over period of of a few minutes to a few hours, for purposes of browsing, carrying out a "web transaction" or conducting some other activity. An example is visiting an on-line "bookstore," browsing, adding items to the shopping cart and paying—all, together, which constitutes a sample session.

Figure 1:
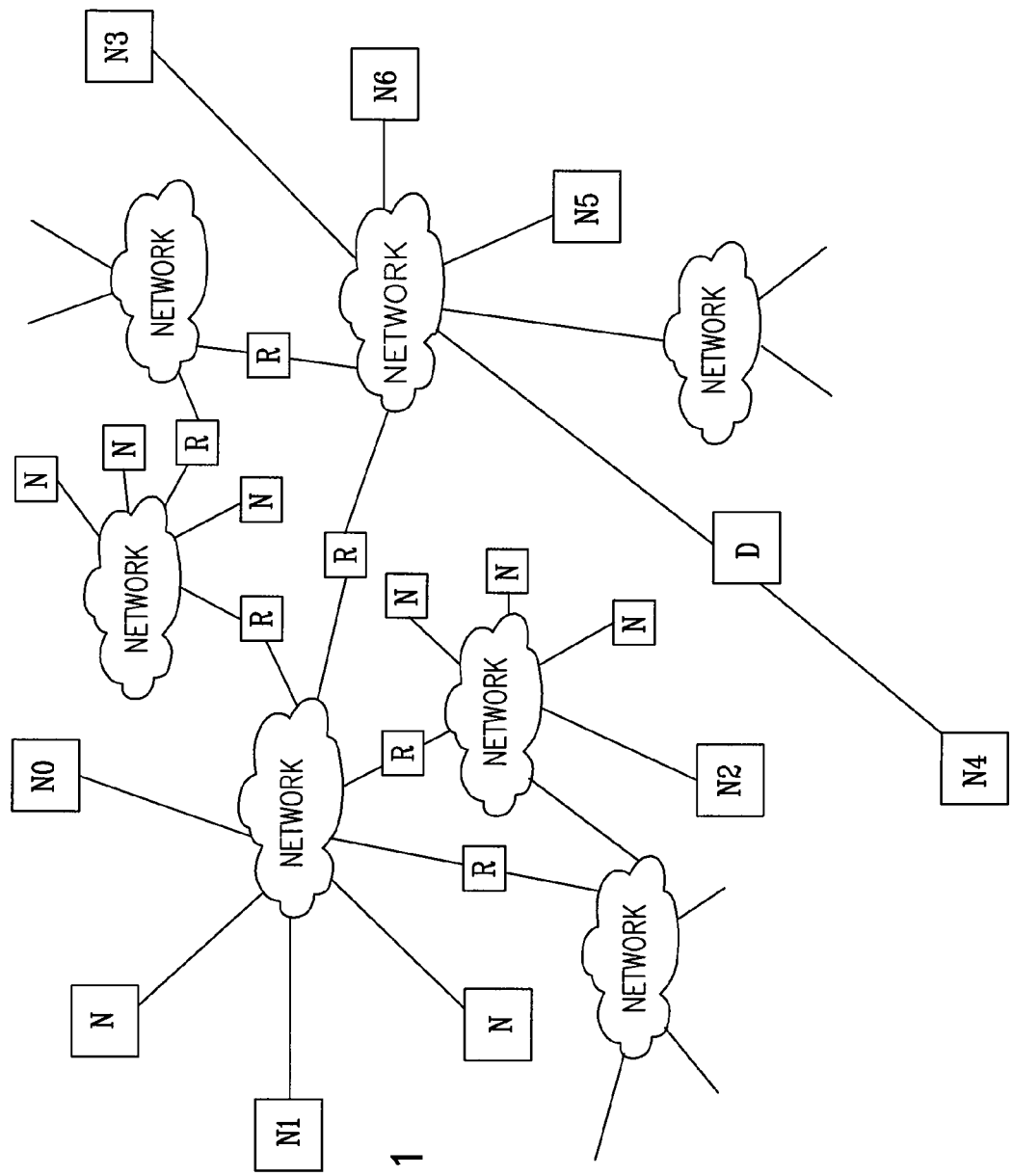
FIG. 1 depicts a distributed network of the type with which the invention is practiced.

FIG. 1 depicts a distributed network of the type with which the invention is practiced. Illustrated are nodes N (including nodes N0-N4) configured as local area networks (LANs), wide area networks (WANs), data-centers, metropolitan area networks (MANs) or other subnetworks or portions interconnected by switching elements R. The Illustrated network comprises an IP network, such as the Internet. However, those skilled in the art will appreciate that the teachings herein may be applied to networks operating under other protocols, as well.

Illustrated nodes N comprise hosts and servers of the type commonly used on an IP network, such as the Internet. In addition, the nodes may comprise any device or collection of devices capable of directly or indirectly interfacing with the network or portion thereof, e.g., though an interface card, gateway or other network interface apparatus.

Illustrated switching elements R are of the type commercially available in the marketplace and commonly used on an IP network, such as the Internet, to route data between nodes and/or within and between portions of the network. These switching elements include routers, gateways, switches, bridges, and other digital data apparatus of the type known in the art for the aforesaid purpose. The elements R may also include "guard machines" of the type described in copending commonly assigned U.S. Pat. No. 09/929,877, filed Aug. 14, 2001, PCT PCT/US01/32273, filed Oct. 16, 2001, entitled "Methods and Apparatus for Protecting Against Overload Conditions on Nodes of a Distributed Network," the teachings of which are incorporated herein by reference, particularly, for example, at FIGS. 1-3, and the accompanying text.

FIG. 1 also depicts apparatus D according to the invention that protects a node, here, node N4, from an network traffic overload condition. That condition, in the illustrated embodiment, is a DDoS attack; however, those skilled in the art will appreciate that the teachings hereof may be applied in the protection of nodes against other network traffic-related overload conditions. The apparatus D may be located between associated node N4 and the sources of traffic to it, such that part or all of the traffic destined to that victim N4 passes through the apparatus D before reaching the N4 (hereinafter, typically referred to as the "victim"). In the illustration, apparatus D is positioned immediately upstream from victim N4 and, hence, all traffic destined from N4 passes through D. In another embodiment, apparatus D may be positioned to receive traffic destined for N4 only during an actual or apparent DDoS attack. Such selective routing may be realized, for example, by use of diversion and/or routing methods known in the art or, preferably, by use of one or more of the aforementioned guard machines.

Those skilled in the art will appreciate that, although only one network apparatus D is shown, a plurality of such devices may be disposed about the illustrated network, e.g., with one or more dedicated to protecting ingress traffic routes to each node (e.g., N4) of interest.

Network Apparatus D

Figure 2:
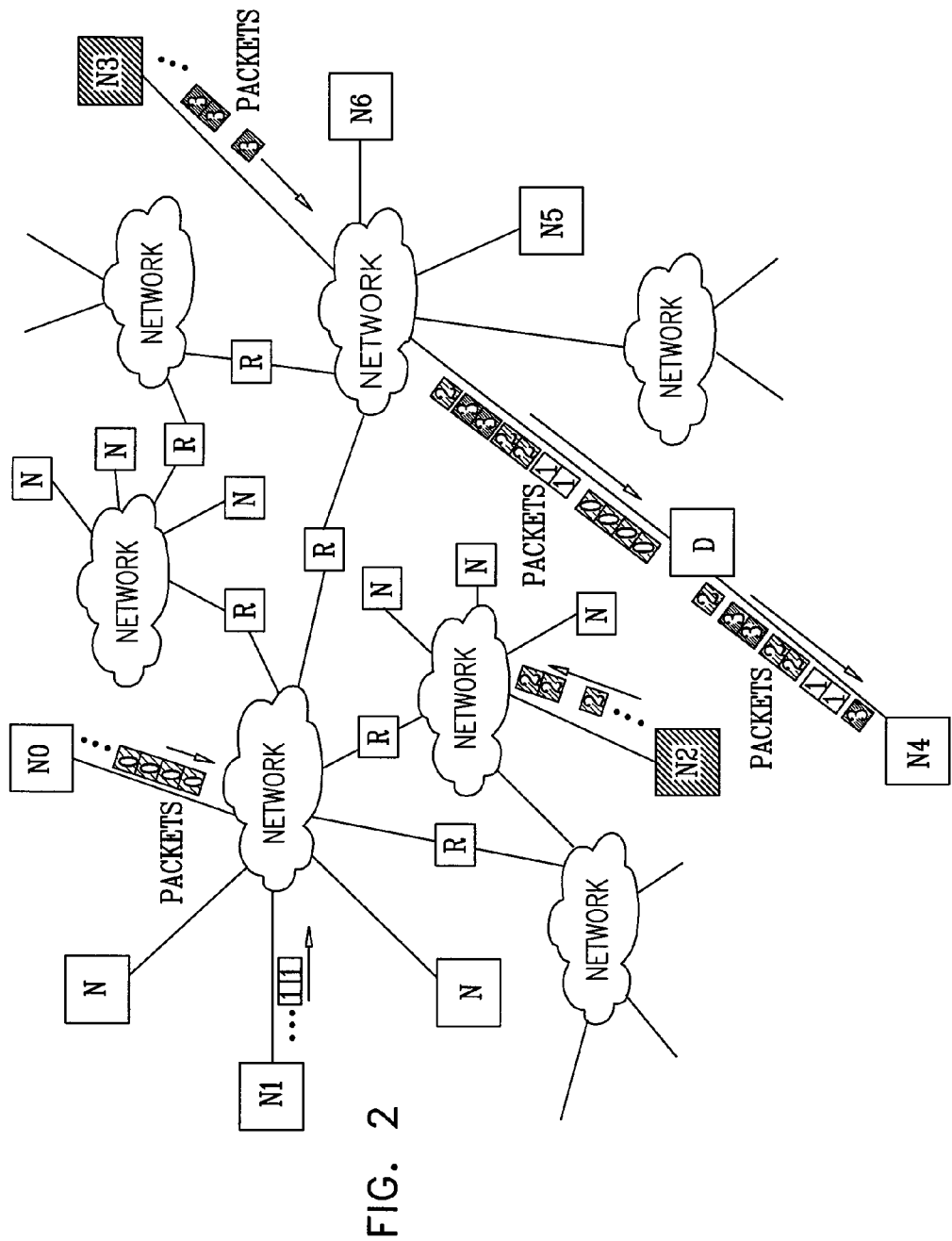
FIG. 2 depicts packet traffic generated by nodes N0-N3 in the network of FIG. 1.

Apparatus D sorts traffic destined for the associated victim node, filtering out and/or discriminating against messages coming from attacking or apparently sources. This is illustrated in FIG. 2, which depicts packet traffic generated by nodes N-N, disposed about the network, destined for node N. Apparatus D detects that from node N as malicious and prevents it from passing to N. The other incoming traffic is allowed to pass, as illustrated.

The apparatus D classifies the traffic based on different parameters in the packets, such as the sources that sent it (classification into ID-streams, or streams for short). Such identification can be based, for example, primarily on the source IP address (and source port) of the traffic. Regardless, the goal of the new module is to minimize the bandwidth allocated (on the way from the apparatus to the victim's machine) to the maliciously attacking sources while maximizing the bandwidth allocated to the innocent (non-attacking) sources.

Figure 3A:
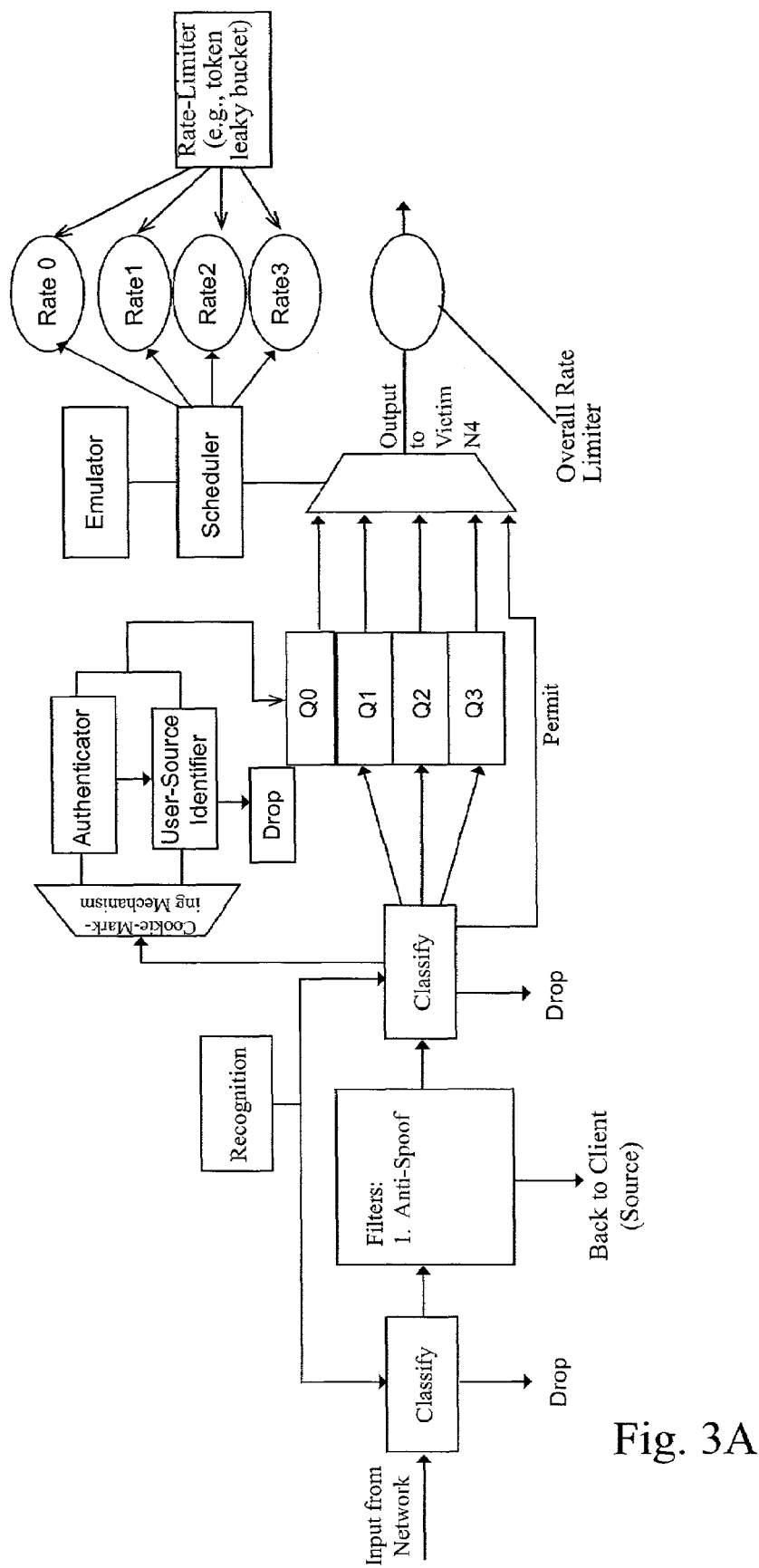
FIGS. 3A-3B depict a network apparatus according to one practice of the invention.
Figure 3B:
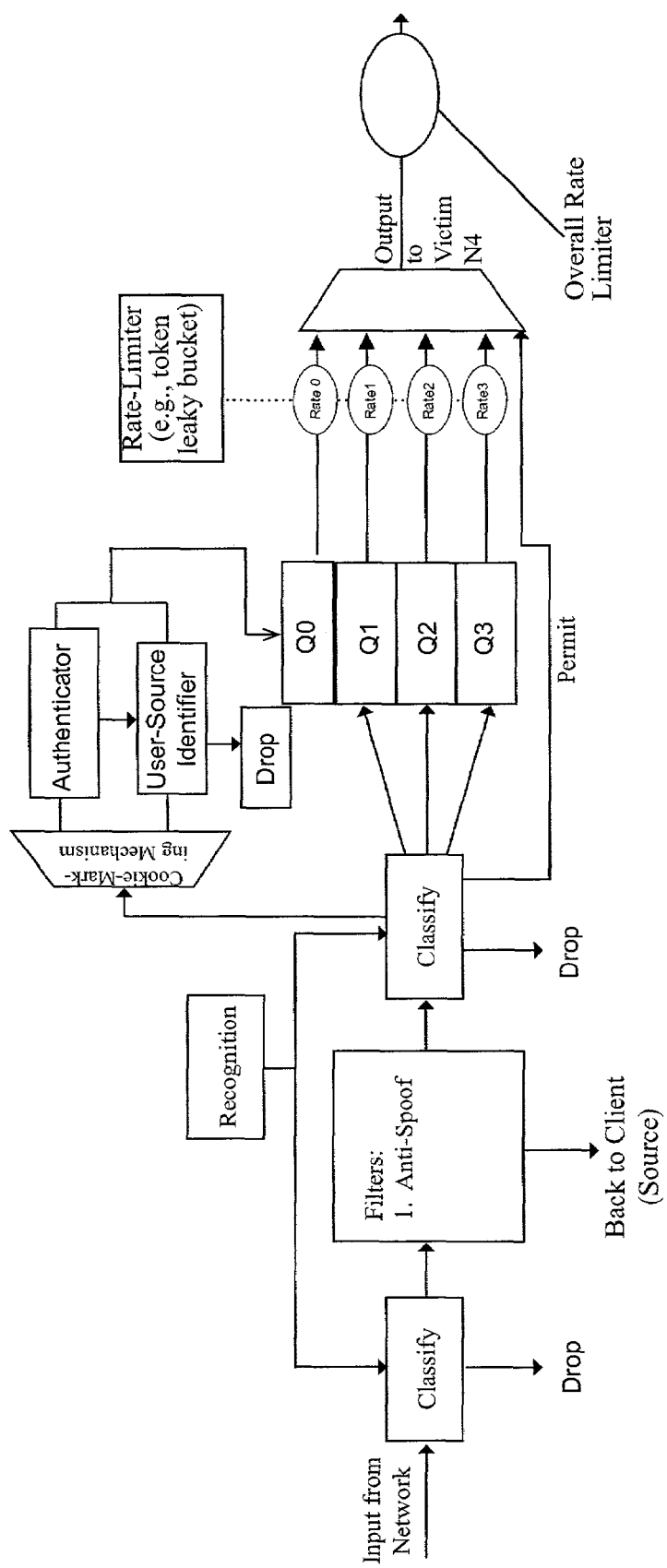

Referring to FIGS. 3A-3B, the apparatus D combines operations of one or more of the mechanisms described below. As those skilled in the art will appreciate, the apparatus D shown in FIG. 3B represents a simplification of that shown in FIG. 3A, both implementations of which are embodiments of the invention.

Sorting or Classification Mechanism

A sorting mechanism (labelled "classify" in the illustration) segregates the packets into different classes for placement in the queues. This is based on parameters associated with the packets, e.g., any combination of source IP address, source TCP/IP port, destination IP address, destination TCP/IP port number, and protocol type, and so forth. Together with the scheduling mechanism, which dequeues the packets for transmittal to the victim N4 according to parameters associated with each queue (or class), this mechanism provides a way to control the rate at which different types of flows are allowed to communicate with the victim.

One usage of such a control is to limit the rate at which one source IP transmits to the victim to the rate at which this source transmits at normal times. Another non-limiting example of this is a weighted fair queuing mechanism, discussed below, which is based on directing the streams of packets into different queues and controlling the amount of processing/bandwidth given at the apparatus to each queue. This is used to provide each stream only its "fair share" of the bandwidth sent to the victim and thus to block some of the traffic of sources which demand more than their "fair bandwidth share."

Recognition

In some embodiments, e.g., as illustrated here, a recognition module can work in conjunction with the sorting mechanism to assign a "suspiciousness" level (for example, from 1 to 5) to the incoming sessions or flows. The suspiciousness level can determine, or factor into determining, which queue a packet is placed in. For example, all packets having lower levels of suspiciousness and, therefore, believed to derive from legitimate sources, can be queued to high priority queues based on the classifications determined by the sorting mechanism. Those packets with a higher level of suspiciousness can be placed in a single low priority queue (or set of queues). Only when there is nothing to transmit from the high priority/legitimate class queue, does the scheduler (e.g., operating in accord with a rate-limited WFQ mechanism, as described below) attend to the low priority/suspicious queue(s).

Scheduling Mechanism

This mechanism schedules transmission of the packets of the different classes. This mechanism allocates "fair bandwidth shares" to the classes while allowing individual streams to be bursty and preventing individual streams (such as those attributable to malicious attackers) from "hogging" the system resources or the victim resources.

The scheduling mechanism, which determines the rate and order by which packets are sent of the different classes, can be supported by a dropping mechanism whose task is to drop packets from some or all of the classes according to their "fair share" and in order to prevent the apparatus buffers from overflowing.

Individual-User Source Identification Mechanism

The aim of this mechanism is to identify an individual user, called a session, from a collection of users that appear all to come from the same source (all their packets arrive with the same source IP address). One typical occurrence of such a situation is when two or more users are served by a proxy that represents them to web servers in the Internet. The mechanism can be used in the following ways, among others:
- To estimate the number of different sessions which are currently active from behind a specific proxy (or any small set of IP addresses) and to use that estimate in order to decide how many resources to allow that IP address to use (e.g., in case weighted fair queuing is used this will be employed to determine the weight of the proxy IP address/queue). I.e., what traffic rate to allow that IP address to apply on the victim.
- To treat each session individually as one separate connection, e.g., to give it a certain bandwidth that corresponds to the normal maximum usage of one end user.
- To deduce that all the packets that do not comply with the identification protocol are likely to be malicious sources and can be blocked.
- To track an end user that was authenticated to be a real user rather than a malicious automatic process that floods the victim with malicious packets Traffic streams coming from multi session sources, such as proxies and NATs, may correspond to many users and thus are naturally large in volume and may mistakenly be thought as being malicious. The mechanisms above assist in identifying the number of users to which such streams correspond.

Authentication Mechanism

In some embodiments, the individual user-source identification mechanism is supported by a user/machine authentication mechanism. The functions to distinguish between machine-generated requests (which are more likely to represent attacking sources) and human-generated requests (which are, typically, less likely to represent attacking sources)

Other

In addition, to the foregoing, the apparatus D can include a filter that provides anti-spoofing, automatic (rule-based) dropping and/or automatic passing of packets, for example, as shown in the drawing. With regard to spoofing, the discussion that follows assume that anti-spoofing is provided by such a filter or elsewhere "upstream" from apparatus D in the network, such that traffic arriving at apparatus D is not "spoofed." That is, such that real source addresses (including that of proxies) are contained in traffic arriving at apparatus D.

Moreover, an rate limiter (such as a leaky bucket or other rate limiting apparatus) can be provided at the output of the apparatus D to limit the overall rate output by that device to N4. Although operating as a leaky bucket, this should not be confused with the rate-limiters discussed below that are used to set the relative queue weights.

Volume-Based Filtering

The invention is based, in part, on the realization that malicious sources can be distinguished from innocent ones based on volume: A source that generates very large volumes of traffic can be suspected of being malicious However, in the presence of HTTP proxy servers, the problem of identification by volume becomes more complicated. The reason is that the victim (or defender) receives all the IP traffic that comes from the proxy carrying the same source identifier, namely, the proxy server identifier (IP port, that may vary over time, and IP address). Thus, the traffic arriving from the proxy server contains both innocent traffic (requests made by the proxy server on behalf of innocent users) and malicious traffic (requests made by the attacker), all under the same IP address.

Further, since the proxy server may generate relatively large amount of traffic even at no-attack time (due to the multiplicity of users behind it), it may become suspected of being malicious (due to its large volume) even if it has no malicious sources behind it. Thus, apparatus D must conduct proper discrimination in order to properly protect the victim N4.

Pure Fair Queuing Embodiment

According to one practice of the invention, the apparatus D utilizes a pure fair queuing (or a Round Robin) scheduler to filter from traffic destined for victim N packets coming from apparently attacking sources. In this embodiment, traffic is classified into ID-streams, each associated with a unique queue (in a one-to-one manner) and the packets of that stream are queued in that queue. A scheduler "serves" the packets (i.e., places them to an output queue for transfer to the victim N4) in accord with known principles of pure fair queuing (albeit not previously known in the context of the inventions presented herein). Thus, the scheduler looks at all active queues (those who have packets) and attempting to imitate a "head-of the-line" processor sharing (PS) approach. This embodiment is a special case of that based on weighted fair queuing, discussed below. Accordingly, further details regarding implementations that utilizes fair queuing may be attained by reference to that discussion.

The benefit of this implementation is that the bandwidth of throughput from apparatus D to victim N4 is allocated equally between all the distinct ID streams. This implies that an ID stream, which includes traffic of malicious sources, will not get higher allocation than an ID stream that includes only non-malicious sources.

In some embodiments of this type, overall traffic departing apparatus D is limited by a rate limiting mechanism by which the victim is protected from being overwhelmed.

In the foregoing, and throughout the text that follows, an "ID" is an identifier extracted from the packets arriving at the system. The identifier can be: 1) source IP address, 2) source MAC address, 3) an identifier embedded in the packet as a consequence of to higher level protocols (e.g., HTTP cookie), 4) any other identifier, or 5) a combination of the foregoing. In the illustrated embodiment, an ID-stream (or "stream," for short) is the stream all the packets that share the same ID. Note that an ID-stream can be identical to an IP flow, but can also be a superset (e.g. all the traffic arriving from a Proxy server) or a subset of an IP flow.

Weighted Fair Queuing (WFQ) Embodiment

Whereas an embodiment based on fair queuing treats all streams equally regardless of any imposed prioritization, an embodiment utilizing a weighted fair queuing (WFQ) scheduler provides the ability to prioritize between the streams. In such an embodiment, the scheduler allows such priorities to be set and processes the packets in the queues in an order and priority that reflects these weights.

Generally speaking, a scheduler executing the WFQ approach is constructed and operated in accord with known principles of weighted fair queuing (albeit not previously known in the context of the inventions presented herein). Thus, it operates by trying to closely approximate the general processor sharing (GPS) policy in which each of the queues (streams) is assigned with a weight that reflects its relative importance/priority—here, one based on volume. In theory, at every infinitesimal epoch of time, the GPS scheduler concurrently processes all the packets that are residing at the head of their queue, where each packet receives a fraction of service that is proportional to the weight of its queue. In practice, a WFQ scheduler operates by "emulating" that behavior of GPS, but by processing the packets one-by-one (as opposed to concurrently). Particularly, whenever the WFQ scheduler needs to pick a packet for processing it determines which packets would otherwise have been simultaneously processed under the theoretical concurrent approach (GPS) and picks for immediate processing the packet that would have completed service first under GPS.

In some embodiments, such as that illustrated here, the scheduler utilizes an emulator module (see FIG. 3A) operating in accord with the teachings that follow to determine which packets would simultaneously be processed under a theoretical concurrent approach (GPS). The emulator can be invoked for this purpose in response to specific events, packet arrival and packet service completion. Based on arrival times of the packets, the packet lengths (if they differ from each other) and stream weights, the scheduler can determine the next packet service completion time under GPS. This is used to decide which is the packet that will be processed (i.e., transmitted) next by scheduler. Other techniques known in the art for selecting a specific packet for processing from among those selected for concurrent processing can be used, as well or in addition.

GPS possess several important properties, two of which are: at every epoch a stream receives service which is proportional to the weight allocated to it; if the total capacity (band-width) at which the GPS mechanism can process (transmit) packets is given by C, if $W_i$ is the weight of stream i, and if there are total of N streams, then stream i is always guaranteed to receive at least allocation of capacity $$CW_i / \sum_{j=1}^{N} W_j$$

whenever it has packets. Note that (i) stream i may be allocated higher capacity when some of the other streams do not have any packets, and (ii) stream i is guaranteed to receive its share even if some other stream(s) (whether it is malicious or not) attempts to send a very large amount of data.

Since embodiments of the invention utilizing a WFQ scheduler closely approximate GPS, they share the aforementioned properties, as well.

Schedulers according to the invention based on weighted fair queuing can be applied to ID-streams at several granularity levels. For example, the scheduler can be operated at the "bit" level, evaluating the queues as each bit is stored to them. In the illustrated embodiment, however, is the IP packet such that scheduling decisions are only made when whole packets are written to the queues.

The positive properties of WFQ make it appealing to use it for prioritizing the processing of arriving packets during a DDoS attack. The implication of these properties is that once all sources are assigned proper weights, the innocent sources are guaranteed certain bandwidth (that fits their weight) regardless of how much traffic the malicious sources send (as long as the WFQ system does not grant the malicious sources improperly large weights).

Round Robin and Deficit Round Robin Embodiments

Further embodiments of the invention operate similar to that described above, yet, employing schedulers that implement a round robin or deficit round robin (DRR) approaches. Here, as in WFQ embodiment above, traffic is classified into streams, each stream is associated with a unique queue (in a one-to-one manner) and the packets of that stream are queued in that queue. And, as in the WFQ embodiment, each of the queues (streams) is assigned with a weight that reflects its relative importance/priority. The scheduler operates in accord with known principles of Round Robin scheduling (albeit not previously known in the context of the inventions presented herein). Thus, the scheduler operates by visiting the queues (or active queues) in order, typically, a so-called "round-robin" order. Upon visiting a queue, the scheduler selects for processing from that queue a number of packets, where the number is determined to be proportional (or close to proportional) to the queue weight. A "deficit" accounting mechanism may be used to account for cases where the weight indicates that a fraction of packet needs to be processed (while the processor can only process packets as "a whole".).

WFQ Embodiment Without Rate Limiter

Typical web (HTTP) sessions are characterized by being bursty. This burstiness results from the nature of the user activity, in which the user requests a Web page (including all its sub-documents, such as GIF documents and other pictures and elements) stops for a while to read the document and then requests another Web page (with its associated pieces), and so on. Upon requesting the Web page the user is interested in receiving the page as soon as possible and this inflicts on the system a demand to send all the associated data in a short time. While the user reads the page, the system does not need to send any data to the user.

Thus, the load inflicted on the system by a typical user is bursty: relative high demands for a short period, and then very low (or zero) demand for a longer period. A typical scenario of a user is to request the page and all its associated documents (e.g., 15 documents all together) within a few seconds (e.g., 3 seconds) and then to be quiet for a few tens of seconds (e.g., 30 seconds) before making the next page request.

Note that this type of behavior inflicts two types of request rates: 1) peak request rate (PRR), which is the request rate when the user makes the requests (15 documents per 3 seconds in the above example), and 2) average request rate (ARR), which is the average number of requests over time (15 documents per 30 seconds in the above example). Notice that the ARR is a "long term rate" while the PRR is a "temporal rate".

An apparatus D as described above with a WFQ scheduler can utilize fixed weights for each queue. Such a system is, in a sense, a "temporal rate" system. That is, at any epoch its scheduler decides how to distribute its current (temporal) available rate among the (currently) active users. As such, the fixed-weight WFQ embodiment does not necessarily handle both ARR and PRR optimally.

To demonstrate the difficulty, consider now K web users. If all users and, therefore, queues, have equal weights, then at epochs when there are M active users, each of them will receive 1/M of the bandwidth. This is roughly the case when M users request a web page roughly at the same time. Due to the bursty nature of each of these users, at most epochs only a small fraction of the users will be active.

Now, consider a "nudge" user who continuously requests pages. That is, its ARR equals its PRR. Since its weight under this scenario is equal to that of a normal user, at each epoch he/she will receive a share of the system that is equal to that of all currently active users. Being active all the time, this user will receive from the system much more resources (roughly ten times more) than the "normal" users. Such a ("nudge") user can inflict on the system load that is ten-fold higher than that of a normal user, thus potentially overwhelming a WFQ embodiment that lacks a rate-limiter as described below. A DDoS attacker that sends normal web load (normal PRR load) and does it continuously, might likewise overwhelm the system with high load.

WFQ Embodiment with Upstream Rate-Limiter

An apparatus D as described above with a WFQ scheduler can utilize an upstream rate-limiter (not shown) to deal with fair allocation of resources to flows while controlling the burstiness of the flows. In such a configuration, each flow directed to the victim N4 goes through the rate-limiter prior to entering apparatus D. The rate-limiter controls the flow, preventing any flow from entering the WFQ system at too high rate, while allowing controlled bursts to enter the WFQ system.

The rate-limiter can be of a conventional design known in the art, e.g., as described by a "leaky bucket" or a token-bucket mechanism (the tokens should be thought of as credits to consume a resource). The token bucket is of size B, that is, it may contain up-to B tokens. A constant stream of tokens, at rate r, enters the bucket. Thus its content increases over time, until it reaches it maximum value B. This mechanism now can be used to control the flow of packets entering a device. For each packet entering on the input line there must be an available token at the bucket to allow the packet to enter the device. In the event that a token exists, the packet enters the device and a token is removed from the bucket. In the event that a token does not exist the packet may either be dropped (in which case the device is called a policer) or is being held in a queue until a token is available (in which case the device is then called a shaper)—at which time the packet enters the device the token is dropped. More sophisticated rate-controllers may consists of dual token buckets.

The main drawback of this architecture is that it may not operate well when the system is under low load and some of the flows have relatively large volumes of traffic. In such situations the system designer is interested in letting all traffic through without holding it (since the overall rate is low). However, each of the rate limiters will limit the volume of the source it controls to the maximum rate set at the rate control (the rate at which the bucket is filled). Thus, each of these flows finds itself rate-limited to a tight rate limit, while the system is under-loaded.

Note that this drawback does not show up in an embodiment that utilizes a WFQ scheduler without a rate-limiter, since there the set of active flows can take the full system capacity, and thus if the over all load on the system is low, the loaded flows can receive the full attention of the system.

WFQ Embodiment with Dynamic, Rate Limiter-Governed Weighting (Rate Limiter-Governed WFQ)

Figure 5:
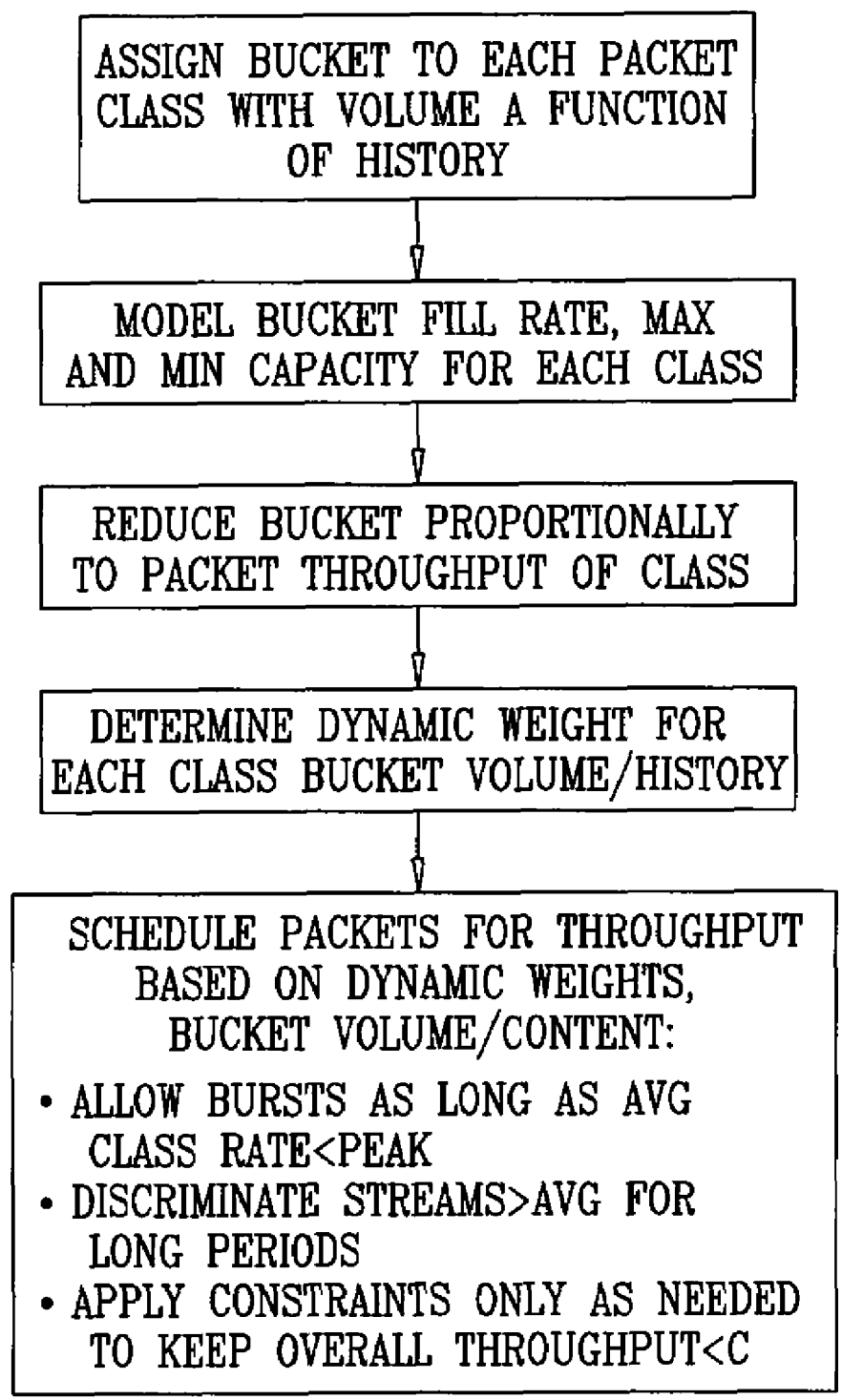
FIG. 5 is a flow chart that schematically illustrate a method for controlling throughout of a network device, in accordance with an embodiment of the present invention.

In a preferred embodiment, the apparatus D implements a novel WFQ queuing policy in which the weight used by the scheduler for each queue—and, therefore, of each user (or class) flow—changes dynamically and in which the overall traffic exiting the apparatus D is limited by some value, e.g., a constant C. The method of implementation this policy, using a token bucket mechanism is shown in FIG. 5 and is described in detail hereinbelow. The policy satisfies the following requirements:

1. Supports bursty users with a peak rate, and an average rate that is smaller than the peak.
2. Discriminates against users that are using more than the average for a long period of time.
3. The limitations 1 and 2 are imposed as a function of the system load. If overall the system is underloaded, then the policy constrains the users (any user) less. That is, while satisfying requirements 1 and 2 above, the policy does not constrain the users unless it is necessary in order to keep the over all load under the level C.

As a consequence, a user (or class of traffic) that did not send data for a long period of time receives larger credit in the system which translates into a (temporal) larger relative weight for that user (or class) under WFQ. In contrast, a user that has transmitted data for a while, has consumed its credit, and thus has less credit left, which translates into a (temporal) smaller relative weight in the WFQ. However, still the overall capacity given to the whole system is C and, thus, if the system is not loaded, then the amount of processing given to each of the individual users can be large (e.g. a user that is alone on the system will get the full band-width C, despite its weight decreasing over time).

According to one embodiment of the invention, the dynamically changing weights of the queues is implemented using a rate-limiter mechanism (e.g., leaky bucket mechanism) of the type described above. Here, however, rather than being used to directly limit that user traffic, the rate limiter is used to control the relative traffic flow rates.

Such a rate limiter of user i can comprise a token bucket of size $B_i$, which fills up at some constant rate $r_i$. That is, $r_i$ tokens are added to the bucket at every time unit unless the bucket is full (when the bucket is full—no tokens are added to it). A token is removed from the bucket whenever the system processes a request belonging to the user. Thus, the contents of the bucket belonging to user (or traffic class) i varies over time and we denote it $L_i(t)$. The weight of each user, $W_i$, which is dynamic too, can be expressed as $W_i(t)$ where its value is determined proportionally to the content of the corresponding bucket. It is set proportional to the $L_i(t)$, so that $W_i(t)=\alpha_i L_i(t)$, for some constant $\alpha_i$.

As a consequence, two identical users (or classes), say User 1 and User 2 (or Class 1 and Class 2), may receive different treatment by the WFQ at time t. For example, if User 1 has just transmitted a burst of requests in the recent period prior to t, its weight at t, may be quite low, say $W_1(t)=1$. In contrast, if User 2 has not transmitted for a long period of time it will have its weight at its maximum value, say $W_2(t)=10$. Thus, at time t, User 1 will get ten times more system resources (e.g., bandwidth) than User 2. One may add to this mechanism a control that does not allow the value of $W_i(t)$ (and thus of $L_i(t)$) to go to zero (that is to set some minimal value, say $B_i^{min}$) to these variables). This change allows the system to continue process packets when it is not loaded (e.g. when only one stream is active).

In another embodiment, the desired effect the policy specified above is achieved by visiting the queues in round robin fashion and servicing from the visited queue (say i) a number of packets that is proportional to its weight $W_i(t)$ as determined by the abovementioned token bucket mechanism $L_i(t)$, and where the token bucket is supported with lower limit on its contents, $B_i^{min}$.

In yet another embodiment, the desired effect of the policy specified above is achieved by visiting the queues in round robin fashion and servicing from the queue an amount of packets proportional to its weight $W_i(t)$ as determined by the abovementioned token bucket mechanism $L_i(t)$, (without a lower limit $B_i^{min}$), and replenishing the bucket not only as a function of time but also each time the round robin visits that queue. That is, the more frequent the scheduler visits a queue, the faster it replenishes the bucket associated with that queue. In any event, each queue is allowed to transmit when the scheduler visits it, according to the number of credit tokens present in the corresponding bucket.

To demonstrate the effectiveness of these mechanisms for protection against DDoS attacks, consider again the "nudge user" attacker. This user would have received (under the example given before) from the WFQ embodiment with fixed weights roughly ten times higher bandwidth than the "normal user" and, thus, would have overloaded that system. In contrast, under the mechanism of a rate-limiter governed WFQ—that is, a scheduler of the type described herein that exercises a WFQ queuing policy in which the weight are dynamically controlled by a rate-limiter—after a short while of operation the rate limiter of the nudge user, $L_{"nudge"}(t)$, will hit its low value say one. In contrast, a normal user will have its weight set to a high value (say, ten), and thus the normal user will receive at time t, ten times more attention than the "nudge" user.

According to some embodiments, the apparatus D utilizes more than one rate-limiter for each queue. Each of the rate-limiters can monitor the stream behavior along different time scales. For example, one limiter can constrain the amount a user transmits over a 30 second period to the normal (average) amount transmitted by a user over such a period of 30 seconds, while the other may control the amount transmitted over a 30 minute period. This can be achieved by maintaining several token bucket mechanisms for each queue, e.g., $L_i^1(t)$ and $L_i^2(t)$, differing from each other in their parameters (rate and size) and having the weight function be proportional to the minimum between them at time t (or to some other function of them at time t).

Implementations of Rate-Limiter Governed WFQ

Described below are methods of dynamically calculating weights in an apparatus D that utilizes rate-limiter governed WFQ. It will be appreciated that these methods can be used in connection with any apparatus D, as described above or otherwise, that utilizes a WFQ scheduler to prioritize among used (class) flows.

One implementation maintains a rate-limiter, $L_i(t)$ (token bucket) for each flow (each queue). The rate limiter is characterized by two parameters: Its filling rate, $r_i$, and size $B_i$. The rate limiter bucket is incremented periodically (e.g., at intervals of fractions of a second) according to the parameter $r_i$. In addition to the rate limiting buckets the system maintains weight parameters $W_i(t)$, which is set to be proportional to $L_i(t)$ (e.g., $W_i(t)=\alpha_i L_i(t)$ for some fixed value of $\alpha_i$). The scheduler itself generally constructed and operated in accord with known principles of weighted fair queuing (albeit not previously known in the context of the inventions presented herein), except however whenever a calculation or a decision is made based on weights, that calculation or decision first updates the values $L_i(t)$, as to account for their recent increment by $r_i$, and the respective dynamic weights $W_i(t)$ and then uses the dynamic weights $W_i(t)$ (instead of using the fixed weights $W_i$). Further, whenever a known principle of weighted fair queuing would call for removing a packet from queue i, the rate-limiter governed WFQ system does the same, while at the same time reducing $L_i(t)$ by 1 and updating $W_i(t)$ respectively.

A variation on the above is a system in which the value of $W_i(t)$ (and thus of $L_i(t)$) is bounded from below by some minimal value $B_i^{min}$ (say 1). This prevents the weight from dropping to zero. Such a mechanism allows the system to give high attention to a flow (queue) when the system is not loaded; in contrast, a system where the weight can drop to zero may reach a situation where it does not serve the demands at a loaded queue Oust because its rate-limiter hit zero) even if there are no other demands in the system (empty queues).

The fact that the weight of a queue is governed by a token bucket mechanism, will provide that a stream that did not send data for long time will get relative larger weight by the system, while a stream that sent much data over the recent past will receive relatively lower weight. This is in contrast to the regular WFQ mechanism in which the weight of a stream is fixed and thus the priority and attention given to it in a cycle is not affected by the amount it transmitted in the past.

Another implementation adds dynamically changing weights to a scheduler generally constructed and operated in accord with known principles of weighted fair queuing (again, albeit not previously known in the context of the inventions presented herein), recomputing $W_i(t)$ whenever a computations is conducted by WFQ. Thus, at any instance at which known principles of weighted fair queuing call for conducting a computation, a scheduler operating in accord with this embodiment first computes the weights $W_i(t)$ (as to express their change over time) and, then, conducts a conventional WQF computation using the new weights.

Specifically, suppose that conventional WFQ principles of operation call for conducting such a computation at time $t_2$, whereas the previous such computation was performed at $t_1$. Then, a scheduler according to this embodiment first compute for each queue i the bucket value $L_i(t_2)$ from $L_i(t_1)$. Assuming that the parameters of the token bucket (of queue i) are $r_i$ (rate of token fill in) and $B_i$ (maximum contents of the bucket) then the computation is as follows if queue i is active (e.g., in the corresponding GPS) at $t_1$:

$$L_i(t_2) = \max\left\{B_i^{\min}, \min\left\{B_i, L_i(t_1) - (t_2 - t_1)C\frac{W_i(t_1)}{\sum_{j \text{ active at } t_1} W_j(t_1)} + (t_2 - t_1)r_i\right\}\right\}$$

If queue i is not active at $t_1$ then the computations is $$L_i(t_2) = \max\{B_i^{\min}, \min\{B_i, L_i(t_1) + (t_2-t_1)r_i\}\}.$$

Note that the expressions include a term $$(t_2 - t_1)C\frac{W_i(t_1)}{\sum_{j \text{ active at } t_1} W_j(t_1)}$$

that takes care of the amount of data processed of this queue at $t_2-t_1$ under GPS, and a term that accounts to the credits $(t_2-t_1)r_i$ accredited to this queue by the token bucket at $t_2-t_1$.

Having computed $L_i(t_2)$, the scheduler of this embodiment computes $W_i(t_2) = \alpha_i L_i(t_2)$. Once all $W_i(t_2)$ are computed, the scheduler can proceed with conventional WFQ computation based on the set $W_i(t_2)$.

Implementations Based on Deficit Round Robin

Dynamic weighting can likewise be used in connection with embodiments that utilize schedulers employing a deficit round robin (DRR). In such embodiments, each queue is associated with a token bucket mechanism $L_i(t)$ that operates similarly to those described above in the section entitled "Implementations of Rate-Limiter Governed WFQ." That is, $L_i(t)$ reduces by 1 for every packet processed of queue i, it increases at constant rate $r_i$, it has maximal value $B_i$ and some minimal value $B_i^{\min}$. It also has a dynamic weight function $W_i(t) = \alpha_i L_i(t)$. The scheduler visits the queues in the same order as in DRR, that is, typically in a round robin order. Upon visiting a queue, the scheduler selects packets for processing. The number of packets selected for processing is determined according to $W_i(t)$ (typically proportional to $W_i(t)$). All mechanisms used in conventional DRR can be used here as well (e.g. the "deficit" mechanism). Likewise, the mechanisms discussed in the section "Implementations of Rate-Limiter Governed WFQ" can be applied here as well, e.g. setting a minimal value larger than zero to $W_i(t)$.

The fact that the weight of a queue is governed by a token bucket mechanism, will provide that a stream that did not send data for long time will get relative larger packet transmission allotment by the system, while a stream that sent much data over the recent past will receive relatively lower packet allotment. This is in contrast to the schedulers constructed and operated in accord with known principles of DRR (albeit not previously known in the context of the inventions presented herein) in which the weight of a stream is fixed and thus the allotment given to it in a cycle is not affected by the amount it transmitted in the past.

In one implementation, when visiting queue i (processing the queue) the scheduler first computes the new value of that queue token bucket and then decides how much to transmit out of this non-empty queue. The new value of the token bucket is computed as follows: Let $t_{prev}$ be the last time that this queue was visited by the scheduler, and $Q(t)$ the number of packets in the queue at time t. To compute the new value of the bucket, the scheduler first computes:

$$L_i(t) := \max\{B_i^{\min}, \min\{(B_i, L_i(t_{prev}) + (t-t_{prev})r_i\}\}$$

Then, it transmits out of the queue an amount equal to $Tx := \min\{L_i(t), Q(t)\}$ and, finally, the scheduler updates $L_i(t)$ as follows: $L_i(t) := L_i(t) - Tx$ and update $t_{prev} := t$. Note that in some cases, the value $L_i(t)$ may possibly be a non-integer. If this is the case, than a deficit round robin technique is applied in the sense that Tx is computed as $Tx := \min\{int(L_i(t)), Q(t)\}$, and the reminder fraction of packet remains as a credit in the token bucket function $L_i(t)$ to be accounted for in the next visit of the queues.

A variant implementation is again to place a bucket of credit tokens at the exit of each queue. However, rather than replenishing the credit tokens bucket as a function of time, the scheduler goes over the queues in some order (for example, round robin order) and replenishes the bucket by some amount each visit. Thus, the more frequently a queue is visited, the faster its bucket of credits is replenished. As a result, each bucket has a minimum number of credit tokens (say 1) upon a visit of the scheduler. When the scheduler processes a queue it first computes its new bucket value and then transmits out of it an amount that is the minimum between the number of packets in the queue and the value of the corresponding bucket. By replenishing the buckets in this way, the apparatus D achieves the effect of not constraining the transmission of flows (even if malicious) when the system is underloaded.

Governing the Queues by Simple Counters

The above examples utilize a token bucket rate-limiter to control the relative weights used by the scheduler for dequeuing the queues. In other embodiments, the token bucket is replaced by more general counters. For example, one can count the amount of traffic a source generated over a period of time (for example 1 minute, or 30 minutes) and use this amount to affect the weight or relative allotment given to the stream. If the counted amount is large, by way of non-limiting example, then reduce the weight used for the stream under WFQ.

Governing the Classes by Other Scheduling Policies

In other embodiments, an arbitrary scheduling policy to control the various classes is used. By way of non-limiting example, full priority may be given to one queue or another. Another example is where the scheduler conducts a round-robin visit among the queues/classes and uses some function (depending in a non-limiting way, on the class parameters, on the amount of attention given to the classes recently, and/or on how suspicious each of the classes is as being malicious) to decide how much attention to give to the class at each such visit.

Controlling the Overall Rate Sent out of the Apparatus

In some embodiments, the apparatus D is used with an overall rate limiter. This can be installed at the "exit" of the apparatus D and can use a token bucket or other mechanisms to control to overall rate being sent out of the device. It can also be implemented as a function that controls and limits the operation of the scheduler. For example, such mechanism can be implemented by holding the scheduler operation (putting it to "sleep" mode) whenever it exceeds the overall rate at which it suppose to send data out.

Recognizing End Users

Packets that arrive at the queuing subsystem of apparatus D are sorted into the different queues according to identifying parameters. Regardless of whether packets that belong to each particular session (e.g., between a web site located on victim node N and a specific visitor to that site) are stored to separate respective queues, the apparatus D preferably capable of distinguishes among packets on a per session basis. In some embodiments, this is accomplished based, for example, on unique source IP addresses contained in the packets. However, this is not always successful, e.g., where multiple users (some of who may be malicious and some of who may not) use a common HTTP proxy server.

Some embodiments, accordingly, use further identifiers to distinguish among different users in a stream and thus, for example, to achieve the ability to penalize the malicious sources and to better protect non-malicious sources. This is done using the cookie mechanism of the HTTP protocol.

In case of packets that already contain cookies that uniquely identify particular respective sessions (e.g., on account of applications executing in the sessions), those cookies are used for the aforesaid purpose. In the case of packets that lack cookies suitable for uniquely identifying particular sessions, the apparatus D assigns a unique cookie to each source and uses the HTTP protocol to instruct the source to use that cookie in further communications with the victim N4. Note that this is allowed even if the victim has ordered the source to use another cookie, since the HTTP protocol allows to use multiple cookies. Packets arriving at apparatus D containing cookies that it (as opposed to victim N4) caused the sources to use are stripped of those packets, e.g., if necessary to prevent them from being forwarded to, and confusing, the victim N4.

While some embodiments utilize unique cookies for purposes of distinguishing among particular sessions, other embodiments of apparatus D assign a common cookie to multiple sessions. Such a cookie might indicate, for example, that those particular sessions have been validated as not being sourced by a DDoS attacker and, hence, that packets for the sessions are to be queued to 'validated' queues granted full bandwidth to the victim N4.

Conversely, the apparatus D can maintain a separate queue for all the requests that come from suspected streams (e.g., large streams that need refinement), e.g., those that do not have a unique and/or validated cookie. Thus, new clients are being served, but malicious sources that keep sending requests without a cookie are constrained in the amount of band-width they may consume.

The apparatus D need not use of cookies in the manner described above at all times but, rather, can limit their use to periods of actual or apparent DDoS attack. In cases where the apparatus D itself has caused the sources to use cookies, the apparatus can send Set-Cookie headers with Max-Age=0 to the sources when the attack is over, indicating that the cookies should not be used in the future.

Authentication Mechanism

The unique identification of user sessions via cookies can be supported, where necessary, by user/machine authentication. The objective of this authentication is to distinguish between machine generated requests and human-being generated requests. This is used in two ways to protect against DDoS attacks: first, if a malicious process floods the victim from behind a proxy or a NAT, and second in the case in which the malicious process pretends to be many users by using many different HTTP cookies.

In the first case, authentication is used to verify that a source that generates a flood of packets is a real human being and not an automatic process. The cookie mechanism is used to identify the authenticated connection/session.

In the second case, again, each session with a new un-authenticated cookie is first authenticated before allowing to proceed. Thus again, eliminating and blocking automatic processes. The authentication approach itself is based on presenting the user with a challenge, a very simple message that requires his/her simple response, a reaction that is very hard to generate by a pre-programmed machine. For example, requesting the user to click on a certain number from a collection of numbers that are presented to him/her, or clicking on a specific part of a picture. Once a correct reply is received for the challenge an okay cookie is associated with all the packets that follow on this session.

Recognizing Malicious Sources

The apparatus D can collect statistical characteristics of different sources during normal operation, a process that we call peace time learning, e.g., in order to distinguish between malicious and non-malicious sources. The basic idea is that traffic sources that appear to be flooding the victim N4 with traffic are passed through a module that assigns each session within the flood a cookie. Each session can then be assigned its own queue and can be monitored to make sure its usage is within the normal volume of a single user on that victim.

To this end, the apparatus D collects statistical information about the traffic patterns of different sources behavior during normal operation. The data of small traffic sources is aggregated into aggregates in order to avoid explosion of information, e.g., the statistical characteristics of all the sources that are smaller than the $90^{th}$ percentile source is kept as one set of parameters that corresponds to any of these sources. The data of large sources is kept specifically with each such source. Since there are not many large sources (order of 10,000 or less) this keeps the data base in reasonable size. The type of statistic measures to be saved may include but are not limited to:

1. Mean traffic rate, measured either by inter-arrival times, requests per second, or other means. The measurement can be done at various time scales. A typical time scale is time scale of several hours. The measurement is then conducted by counting the number of requests generated by a source over that time period and dividing the number of requests by the measurement interval at various time scales.
2. Burst parameters, such as burst size, burst peak rate, burst duration and burst frequency.
3. Refresh rate, which amounts to the requests that explicitly disallow to be served by proxies.
4. Illegal page request rate (HTML page error 404), which amounts to requests made to illegal or non-existing pages.
5. Request pattern, such as the request and reply sizes (measured in bytes), types of pages requested, pattern of pages requested.

The system may also gather correlation statistics among these measures.

During an attack the behavior of the various streams received by apparatus D is monitored. The malicious streams will have a very different behavior than that of innocent streams. Some of this deviation will be captured by the classifier. Note, however, that there are parameters which are highly informative and for various reasons are not measured during normal operation.

An example is the queue length of the various streams in queues of embodiments that use FQ-based or WFQ-based scheduling. Streams that correspond to malicious sources are expected to form very large queues due to their very high volume and thus large queue size is a good indicator for malicious behavior. Note that, nonetheless, measuring the stream's queue length at normal operation, in order to compare it to queue length during attack time, might be infeasible since it might be either intrusive or resource consuming (since it requires the passing of the traffic through the apparatus during normal operation). Thus, the monitoring of the queue lengths at attack time is used to identify malicious sources, even without comparing it with the normal operation queue length.

The following describes a concrete method that uses this approach in conjunction with a WFQ embodiment of the invention as described above.

1. During normal operation rate statistics is gathered for each stream.
2. During an actual or apparent DDoS attack time:
   a. The streams are directed into a WFQ mechanism where the initial weights are proportional to the mean rate ($\mu_i$) plus a constant (c) times the variance ($\sigma_i$), that is we have $W_i = \mu_i + c\sigma_i$. Note that if the traffic volume of source i behaves according to a normal distribution (for all i) and if the same c is chosen for all sources, then the probability that the traffic volume of source i exceeds the above $W_i$ is the same for all sources. The idea behind these weights is therefore that if the weights reflect the actual bandwidth allocated to the sources, then they all have the same probability of overflowing.
   b. The system continuously monitors the queue lengths of all streams.
   c. Streams whose queue length is very high relatively to that of the other queues are suspected to include malicious sources and are diverted into a source recognition mechanism.
   d. The source recognition mechanism assigns cookies to each individual source in the suspected stream.
3. Sources that cooperate and provide cookies on their future packets are assigned a new individual queue whose weight corresponds to the behavior of typical single user (as can be computed by the system during normal operation).
4. Sources that do not cooperate and do not provide cookies in their packets are collected into one aggregate stream that receives a small weight.

The process results with a situation where almost all innocent sources receive proper weight by the WFQ mechanism, and thus are guaranteed good performance. The only sources that may suffer severe performance degradation are either 1) malicious sources, or 2) sources which are not willing to provide a cookie (note that in most cases most of the latter sources are expected enjoy good performance as well).

Figure 4:
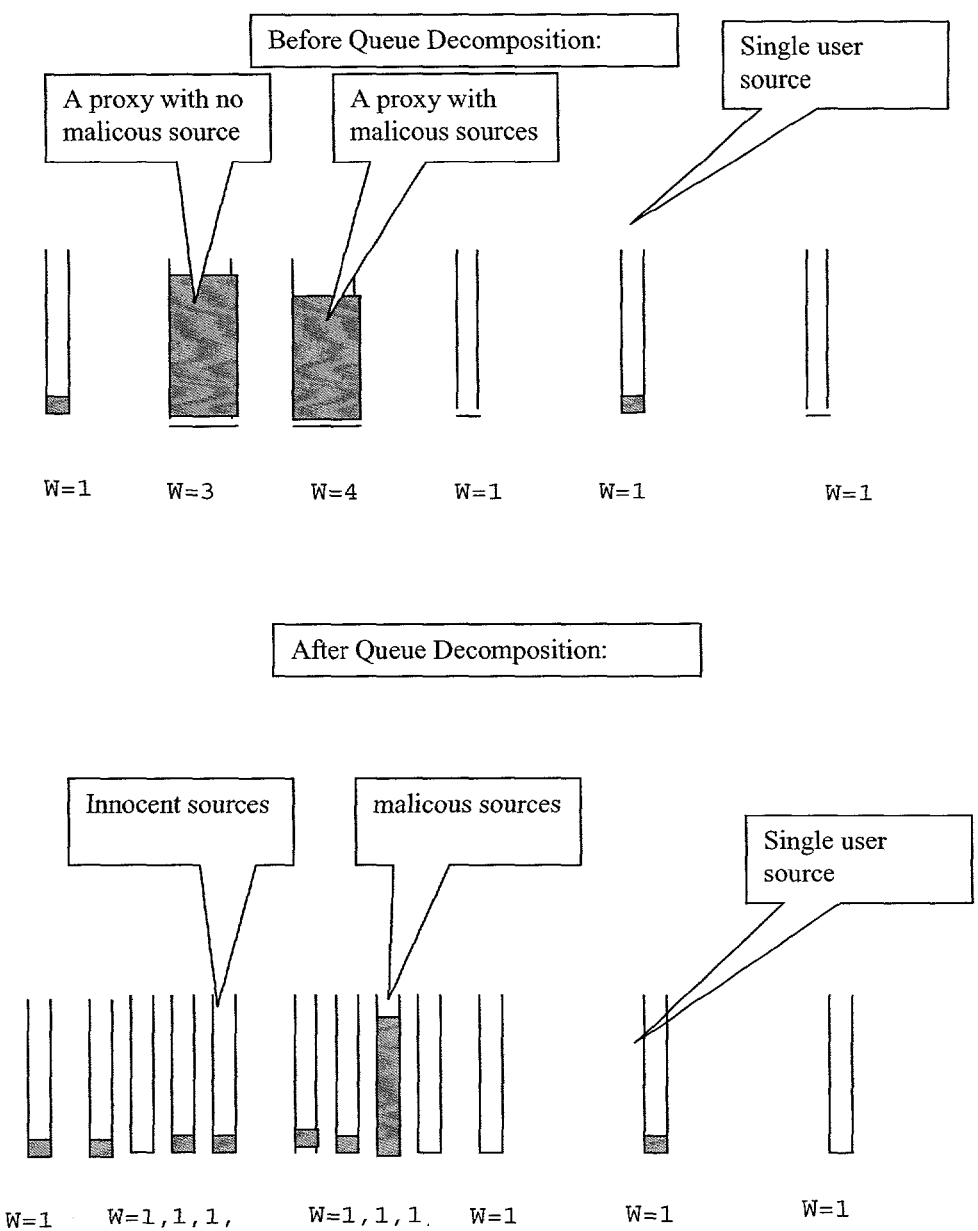
FIG. 4 depicts a result of use of the marking/cookie mechanism to segregate flows in an apparatus of FIGS. 3A-3B.

A graphical description of this process is given in FIG. 4. In this diagram, two queues are shown corresponding to proxy sources and subject to heavy load. The initial weight setup (3 and 4) is not sufficient to handle the traffic either due to an under-estimate of the source innocent traffic volume or because of the malicious source. Thus the two sources experience long queues and poor performance. Due to their long queues, the sources are directed by apparatus D to individual small queues (based on the cookie assignment), that is, the queues are decomposed. As a result, all innocent sources end-up with small queues (and good performance) while the malicious source ends-up with a long queue and poor performance.

Described above are systems and method achieving the desired objects. Those skilled in the art will appreciate that the embodiments discussed herein are merely examples of the invention and that other embodiments, incorporating modifications thereto, fall within the scope of the invention. Thus, for example, whereas the discussion above is primarily focused on communications over the Internet, the teachings are equally applicable to other networks, whether or not IP-based. By way of further example, whereas the discussion above illustrates a few techniques for dynamic weighting of queues, other techniques may be employed, as well. By way of still further example, though the illustrated embodiments utilize queues, other embodiments of the invention which lack such queues may nonetheless utilize pure fair queuing, weighted fair queuing, round-robin techniques, and so forth, in the manner described above and accordingly fall within the scope of the invention. By way of still further example, it will be appreciated that although the apparatus D is depicted as a separate device on the network, one or more functions of that device may be incorporated into other network devices. Thus, for example, those functions may be incorporated into a router, an aforementioned guard machine, or a server, to name a few such devices.

In view thereof, what we claim is:

1. In a network device deployed on a network, the improvement for controlling throughput comprising
   a scheduler that schedules one or more packets of at least a selected class for throughput as a function of a dynamic weight of that class and dynamic weights of one or more other classes,
   a bucket mechanism comprising any of a leaky bucket mechanism and a token bucket mechanism coupled to the scheduler that (i) uses for each class a bucket whose volume is a function of a history of traffic of packets in the respective class received by the network device, and (ii) determines the dynamic weight of each class as a function of the volume of the respective bucket,
   the bucket mechanism models each bucket as (i) filling at a rate associated with the respective class, (ii) having a minimum capacity associated with that class, and a maximum capacity associated with that class, and
   the bucket mechanism reduces each bucket proportionally to a volume of packets throughput for the respective class by the scheduler,
   the scheduler schedules for throughput at a time t a volume of packets of the selected class that is proportional to a content of the bucket for that class at that time so as to protect against overload conditions caused by traffic on the network.

2. In the network device of claim 1, the further improvement wherein scheduler (i) schedules for throughput only whole packets of the selected class, and (ii) credits the bucket associated with the selected class if the volume of packets of that class that would be scheduled for throughput includes a fraction of a packet.

3. In a method of operating a network device deployed on a network, the improvement for controlling throughput comprising the step of scheduling packets, if any, in each of a plurality of classes for throughput,
   the scheduling step including
   A. allowing throughput bursts of packets from the respective classes so long as an average rate therefrom does not exceed a first selected level,
   B. discriminating against throughput of streams of packets that exceed an average for more than a selected period, where a stream comprises a plurality of packets from a given source to a given destination, so as to protect against overload conditions caused by traffic on the network,
   C. exercising (A) and (B) only to an extent substantially necessary to keep overall throughput under a second selected level, wherein the scheduling step includes scheduling one or more packets of a selected class for throughout as a function of a weight of that class and weights of one or more other classes, the weight of at last the selected class being a dynamic weight that is a function of a history of volume of packets received by the network device in the selected class.

4. In the method of claim 3, the further improvement wherein the scheduling step operates in accord with weighted fair queuing (WFQ) using, as a weight for the one or more packets of the selected class, the dynamic weight of the class.

5. In the method of claim 3, the further improvement wherein the scheduling step operates in accord with any of round robin and deficit round robin (DRR) scheduling using, as a weight for the one or more packets of the selected class, the dynamic weight of the class.

6. In the method of any one of claims 4-5, the further improvement comprising determining the dynamic weights by rate-limiting.

7. In the method of claim 6, the further improvement wherein the rate-limiting operates in accord with any of a leaky bucket and a token bucket.

8. In the method of claim 7, the further improvement wherein the rate-limiting includes applying a bucket for each of at least the selected class and one or more other classes, and modelling each bucket as (i) filling at a rate associated with the respective class, (ii) having a minimum capacity associated with that class, and a maximum capacity associated with that class.

9. In the method of claim 8, the further improvement wherein the rate-limiting includes reducing each bucket proportionally to a volume of packets throughput for the respective class by the scheduler.

10. In the method of claim 9, the further improvement wherein the rate-limiting includes reducing each bucket proportionally to a volume any of actually and theoretically throughput for the respective class.

11. In the method of claim 8, the further improvement wherein the rate-limiting includes determining a volume of a bucket for at least a class i as a function of a relation $$L_i(t_2) = \max\left\{B_i^{\min}, \min\left\{B_i, L_i(t_1) - (t_2 - t_1)C\frac{W_i(t_1)}{\sum_{j \text{ active at } t_1} W_j(t_1)} + (t_2 - t_1)r_i\right\}\right\}$$

where
$L_1(t_2)$ is the volume of the bucket for class i during epoch $t_2$;
$L_1(t_1)$ is the volume of the bucket for class i during epoch $t_1$;
$B_i^{\min}$ is a minimum capacity for the bucket for class i;
$B_i$ is a maximum capacity for the bucket for class i;
C is a measure of overall traffic throughput by the device;
$W_i(t_1)$ is a weight assigned to class i during epoch $t_1$;
$W_j(t_1)$ is a weight assigned to class j during epoch $t_1$;
$r_i$ is a filling rate of the bucket for class i.

12. In the method of claim 11, the further improvement wherein the rate-limiting includes determining the volume of the bucket for class i in accord with the foregoing relation if one or more packets for that class were actually or theoretically throughput (or pending therefor) during the epoch $t_1$.

13. In the method of claim 8, the further improvement wherein the rate-limiting includes determining a volume of a bucket for at least a class i as a function of a relation $$L_i(t_2) = \max\left\{B_i^{\min}, \min\left\{B_i, L_i(t_1) - (t_2 - t_1)C\frac{W_i(t_1)}{\sum_{j \text{ active at } t_1} W_j(t_1)} + (t_2 - t_1)r_i\right\}\right\}$$

where
$L_i(t_2)$ is the volume of the bucket for class i during epoch $t_2$;
$L_1(t_1)$ is the volume of the bucket for class i during epoch $t_1$;
$B_i^{\min}$ is a minimum capacity for the bucket for class i;
$B_i$ is a maximum capacity for the bucket for class i;
$r_i$ is a filling rate of the bucket for class i.

14. In the method of claim 13, the further improvement wherein the rate-limiting includes determining the volume of the bucket for class i in accord with the foregoing relation if one or more packets for that class were not actually or theoretically throughput (or pending therefor) during the epoch $t_1$.

15. In the method of claim 13, the further improvement wherein the rate-limiting includes decrementing the volume of the bucket for class i at an epoch t during which one or more packets are throughput by an amount proportional to any of a size and number of those one or more packets.

16. An apparatus for protecting against overload conditions on a network, comprising
a plurality of queues,
a scheduler coupled to the queues that schedules packets therein for dequeuing for output as a function of a dynamic weight of associated with each queue,
a bucket mechanism comprising any of a leaky bucket mechanism and a token bucket mechanism coupled to the scheduler that (i) uses for each queue a bucket whose volume is a function of a history of traffic of packets received by the apparatus and placed in the respective queue, and (ii) determines the dynamic weight of each queue as a function of the volume of the respective bucket,
the bucket mechanism models each bucket as (i) filling at a rate associated with the respective queue, (ii) having a minimum capacity associated with that queue, and a maximum capacity associated with that queue, and
the bucket mechanism reduces each bucket proportionally to a volume of packets throughput for the respective queue by the scheduler,
the scheduler schedules for dequeuing at a time t a volume of packets of the selected queue that is proportional to a content of the bucket for that queue at that time so as to protect against overload conditions caused by traffic on the network.

17. The apparatus of claim 16, wherein the scheduler (i) schedules for dequeuing only whole packets of the selected queue, and (ii) credits the bucket associated with the selected queue if the volume of packets of that queue that would be scheduled for dequeuing includes a fraction of a packet.

18. The apparatus of claim 16 or 17, comprising one or more classifiers that classify packets received by the apparatus for placement in queues associated with those classes.

19. The apparatus of claim 18, wherein an aforesaid classifier classifies a packet according to any combination of one or more of a source IP address, source TCP/IP port, destination IP address, destination TCP/IP port number, and protocol type, or other parameter, associated with that packet.

20. The apparatus of claim 18, comprising functionality, coupled with one or more classifiers, that determines suspiciousness of a packet.

21. The apparatus of claim 20, wherein a classifier places a packet in a queue based on a classification and a suspiciousness of the packet.

22. The apparatus of claim 21, wherein packets of a higher degree of suspiciousness are placed in different queues from packets of a lower degree of suspiciousness.

23. The apparatus of claim 22, wherein the scheduler schedules with lower priority a queue allocated to packets of a higher degree of suspiciousness.

24. The apparatus of claim 16 or 17, comprising a marking mechanism that transmits a cookie to a packet source on the network and causes that source to include the cookie in packets transmitted by it to on the network to a destination associated with the apparatus.

25. The apparatus of claim 24, wherein the marking mechanism transmits the cookie in a packet directed from the destination to the source.

26. The apparatus of claim 24, wherein the marking mechanism strips the cookie from any packets transmitted by the source to the destination.

27. The apparatus of claim 24, wherein the marking mechanism determines suspiciousness of a packet based on a cookie, or absence therein.

28. The apparatus of claim 27, comprising a classifier that places a packet in a queue based, in part, on the suspiciousness of the packet.

29. The apparatus of claim 28, wherein packets of a higher degree of suspiciousness are placed in different queues from packets of a lower degree of suspiciousness.

30. The apparatus of claim 29, wherein the scheduler schedules with lower priority a queue allocated to packets of a higher degree of suspiciousness.

31. The apparatus of claim 24, wherein the marking mechanism distinguishes among packets having at least like source and destination IP addresses, which packets are attributable to different user sessions, wherein the marking mechanism so distinguishes among the packets attributable to different user sessions based on cookies.

32. The apparatus of claim 16 or 17, comprising an authentication module that transmits a challenge to a source on the network and that analyzes a response thereto to determine the suspiciousness of the source.

33. The apparatus of claim 32, wherein a proper response to the challenge is not readily generated by a pre-programmed source.

34. The apparatus of claim 32, wherein responses attributable to pre-programmed sources are deemed to be of higher suspiciousness, while those attributable to human controlled sources are deemed to be of lower suspiciousness.

35. The apparatus of claim 34, comprising a classifier that places a packet in a queue based, in part, on the suspiciousness of the packet.

36. The apparatus of claim 35, wherein packets of a higher degree of suspiciousness are placed in different queues from packets of a lower degree of suspiciousness.

37. The apparatus of claim 36, wherein the scheduler schedules with lower priority a queue allocated to packets of a higher degree of suspiciousness.

* * * * *